US008294927B2

(12) United States Patent
Kunori

(10) Patent No.: US 8,294,927 B2
(45) Date of Patent: Oct. 23, 2012

(54) ACQUIRING DATA FROM SERVER OR SUBSTITUTE DATA FROM MOBILE INFORMATION TERMINAL

(75) Inventor: Shiro Kunori, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1020 days.

(21) Appl. No.: 11/539,726

(22) Filed: Oct. 9, 2006

(65) Prior Publication Data

US 2007/0086051 A1    Apr. 19, 2007

(30) Foreign Application Priority Data

Oct. 17, 2005  (JP) ................................. 2005-302163
Aug. 29, 2006  (JP) ................................. 2006-232815

(51) Int. Cl.
*G06F 3/12* (2006.01)
(52) U.S. Cl. ........ 358/1.15; 358/1.1; 709/223; 709/225; 710/65; 710/62
(58) Field of Classification Search ............... 358/1.1, 358/1.15; 709/223, 225; 710/62, 65
See application file for complete search history.

(56) References Cited

U.S. PATENT DOCUMENTS

| 6,381,029 | B1 * | 4/2002 | Tipirneni ..................... 358/1.14 |
| 7,299,490 | B2 | 11/2007 | Berkema et al. |
| 2002/0083202 | A1 * | 6/2002 | Nakamura ..................... 709/246 |
| 2002/0122201 | A1 * | 9/2002 | Haraguchi et al. ........... 358/1.15 |
| 2003/0164987 | A1 | 9/2003 | Enomoto et al. |
| 2003/0164988 | A1 * | 9/2003 | Enomoto et al. ............. 358/400 |
| 2004/0095612 | A1 * | 5/2004 | Eguchi et al. ................ 358/402 |
| 2004/0205099 | A1 * | 10/2004 | Hagiwara .................... 709/200 |

FOREIGN PATENT DOCUMENTS

| JP | 11-348386 A | 12/1999 |
| JP | 2002-259098 A | 9/2002 |
| JP | 2003-029937 A | 1/2003 |
| JP | 2003-259075 A | 9/2003 |
| JP | 2003-263285 A | 9/2003 |

OTHER PUBLICATIONS

Tanabe et al.,Imaging Method and Apparatus, and Memory Medium, Dec. 21, 1999, JP11348386.*
Office Action issued in corresponding Japanese Patent Application No. 2006-232815 dated Jun. 1, 2009.

* cited by examiner

*Primary Examiner* — Benny Q Tieu
*Assistant Examiner* — Martin Mushambo
(74) *Attorney, Agent, or Firm* — Rossi, Kimms & McDowell LLP

(57) ABSTRACT

Access-destination information specified by a mobile information terminal is received and an access decision unit (108) determines whether it is possible to access a WWW server on a network specified by the access-destination information. If it has been determined that the WWW server is accessible, the WWW server is accessed and data is acquired via a network communication unit (107), and the data is printed by an image processor (109). If it has been determined that the WWW server is inaccessible, on the other hand, then the mobile information terminal is notified of this fact via the network communication unit (107).

12 Claims, 15 Drawing Sheets

F I G. 14
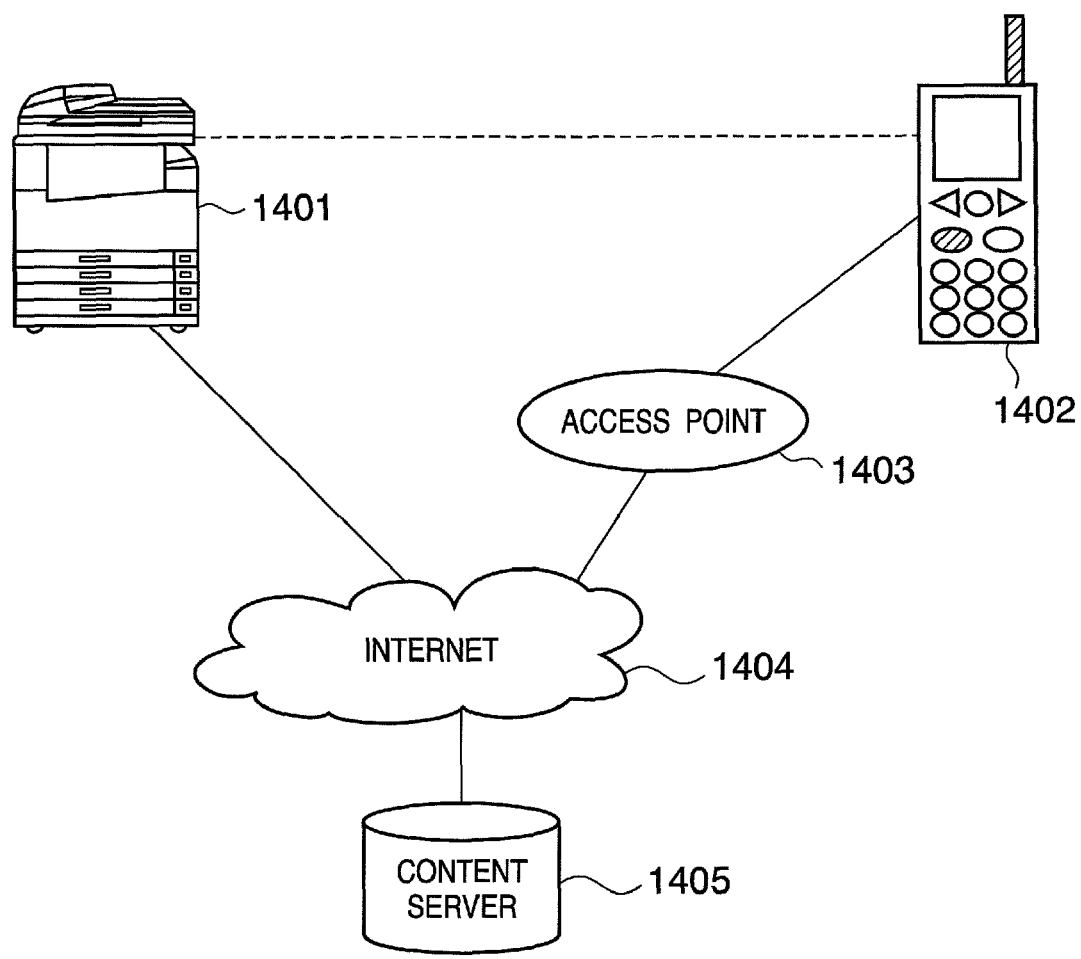

ACQUIRING DATA FROM SERVER OR SUBSTITUTE DATA FROM MOBILE INFORMATION TERMINAL

BACKGROUND OF THE INVENTION

1. Field of the Invention

The present invention relates to an image forming apparatus and method of controlling the same in which security is taken into consideration in the printing of information displayed by a web browser on a mobile information terminal.

2. Description of the Related Art

Mobile information terminals typified by mobile telephones and PDAs now have multiple functions and many of them come equipped with a web browser. The web browser accesses a WWW server on a network, receives data and various content and displays these in the form of a web page. This has been accompanied by growing demand for the printing of the information displayed by the web browser on the portable information terminal.

Thought has been given to a method of transmitting information, which is being displayed by a mobile information terminal, to an image forming apparatus as is and having the apparatus print the information in a manner similar to that in which printing is performed using a personal computer. However, if there is a large quantity of information, as when the page being displayed contains a large number of images or moving pictures, the method described involves prolonged transmission time and higher communication cost. This is inconvenient as far as a mobile information terminal is concerned.

Accordingly, various techniques have been proposed for solving this problem. For example, the specification of Japanese Patent Application Laid-Open No. 11-348386 proposes transmitting information such as an URL, which is for accessing a WWW server, from a PDA or the like to an image forming apparatus, acquiring data by accessing the data on the WWW server based upon the information using the image forming apparatus, and printing the data at the image forming apparatus. Further, the specification of Japanese Patent Application Laid-Open No. 2002-259098 proposes having a PDA or the like acquire advanced print data and simple print data from a WWW server, transmitting only the advanced print data to an image forming apparatus and printing the advanced print data using the image forming apparatus.

With these conventional methods, however, the specified WWW server is accessed unconditionally. This is extremely dangerous from the standpoint of security of the image forming apparatus. For example, there is the danger that the image forming apparatus will access a pay site or a malicious site. In particular, in the case of an image forming apparatus used by a number of unspecified users, it is preferred that the apparatus be adapted taking security into account so that other users will not be affected adversely.

SUMMARY OF THE INVENTION

The present invention enable to provide an image forming apparatus and method of controlling the same that enable printing in ideal fashion while preventing unauthorized utilization of data on a WWW server, which has been specified by a mobile information terminal, and enhancing security.

According to one embodiment of the present invention, the foregoing problem is solved by providing an image forming apparatus comprising a receiving unit adapted to receive an address of a WWW server from a mobile information terminal, a determination unit adapted to determine whether this address is accessible or not, an acquisition unit adapted to access the WWW server and acquire data from the WWW server if the determination unit has determined that the address is accessible, a printing unit adapted to perform printing using the data acquired by the acquisition unit, and a notification unit adapted to notify the mobile information terminal of the fact that the address is not accessible if the determination unit has determined that the address is not accessible.

According to another embodiment of the present invention, the foregoing problem is solved by providing a method of controlling an image forming apparatus for accessing an address received from a mobile information terminal, acquiring data and printing the data based upon the data acquired, comprising the steps of receiving an address of a WWW server from the mobile information terminal, determining whether this address is accessible or not, accessing the WWW server and acquiring data from the WWW server if it has been determined at the determination step that the address is accessible, performing printing using the data acquired at the acquisition step and notifying the mobile information terminal of the fact that the address is not accessible if it has been determined at the determination step that the address is not accessible.

According to another embodiment of the present invention, the foregoing problem is solved by providing a program for controlling an image forming apparatus for accessing an address received from a mobile information terminal, acquiring data and printing the data based upon the data acquired, the program causing the image forming apparatus to execute the following steps:

receiving an address of a WWW server from the mobile information terminal;

determining whether this address is accessible or not;

accessing the WWW server and acquiring data from the WWW server if it has been determined at the determination step that the address is accessible;

performing printing using the data acquired at the acquisition step; and notifying the mobile information terminal of the fact that the address is not accessible if it has been determined at the determination step that the address is not accessible.

Further features of the present invention will become apparent from the following description of exemplary embodiments with reference to attached drawings.

BRIEF DESCRIPTION OF THE DRAWINGS

FIG. 14 is a diagram illustrating a printing system to which the image forming apparatus of the present invention can be applied.

DESCRIPTION OF THE EMBODIMENTS

Figure 1:
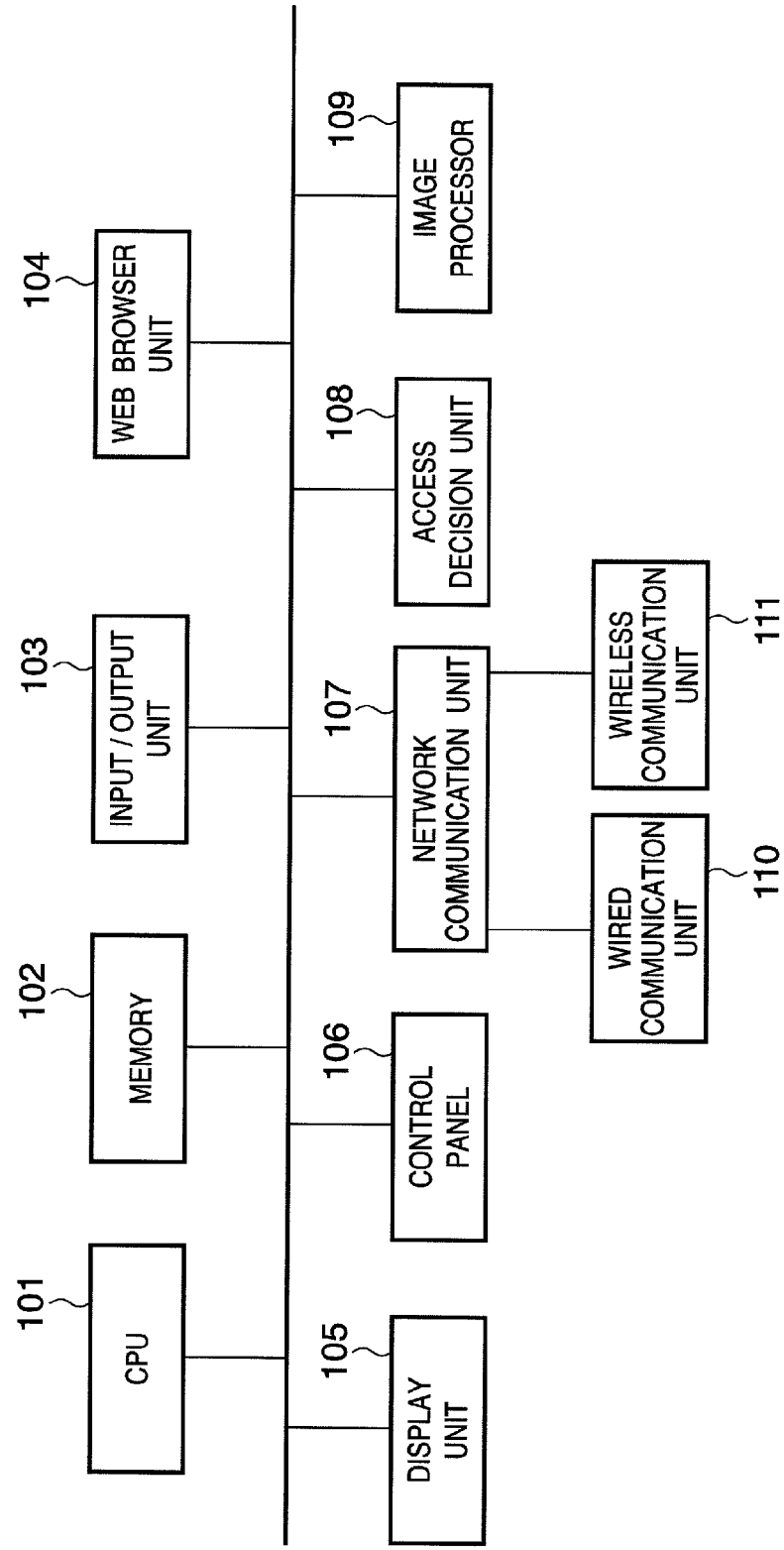
FIG. 1 is a block diagram illustrating a controller of an image forming apparatus common to embodiments of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In the embodiments that follow, a mobile telephone is used as an embodiment of a mobile information terminal. However, the invention is not limited to this arrangement and the mobile information terminal may be a PDA or a portable personal computer. In each of the embodiments, it is possible for the mobile telephone, an image forming apparatus and a WWW server to communicate wirelessly via a mobile telephone network. Further, it is possible for the image forming apparatus and WWW server to communicate via a wired or wireless network.

First Embodiment

[Printing System]

First, reference will be had to FIG. 14 to describe a printing system in which printing is performed by an image forming apparatus 1401 in response to a print command from a multifunction peripheral. The image forming apparatus 1401, an access point 1403 and a content server 1405 are connected by a communication network such as the Internet 1404 using LAN cables. These devices are thus capable of communicating data with one another. It should be noted that although it is assumed that these devices are connected by cables in this embodiment, it is also possible to connect them wirelessly by a Bluetooth function. The access point 1403 relays data received wirelessly from a mobile telephone 1402 (although reception by wire using a LAN cable also is possible) and transmits the data to the Internet 1404. The content server 1405 is for sending, receiving and distributing data, such as a WWW server (HTTP server) or mail server (SMTP server). When a web browser with which the mobile telephone 1402 is equipped outputs a content acquisition command, the access point 1403 receives the command. The access point 1403 transmits the content acquisition command to the content server 1405 (specified by the mobile telephone 1402) via the Internet 1404. The content server 1405 transmits content, which has been acquired in response to the acquisition command, to the access point 1403 via the Internet 1404. The access point 1403 transmits this content to the mobile telephone 1402, which issued the acquisition command. It should be noted that the details of this processing is not set forth here since it is similar to content acquisition processing based upon an ordinary mobile telephone. Further, in a case where the mobile telephone 1402 transmits a print command to the image forming apparatus 1401, this print command also is transmitted to the image forming apparatus 1401 via the access point 1403 and Internet 1404. In the embodiments below, data communication by the mobile telephone 1402 is via the Internet 1404 unless it is specified otherwise. The mobile telephone 1402 and image forming apparatus 1401 can communicate by wire using a USB cable or the like or wirelessly using Bluetooth or the like (see the dashed line in FIG. 14), without relying upon the Internet 1404.

[Image Forming Apparatus]

The fundamental structure of an image forming apparatus equipped with a web browser function and a printing function will be described next. FIG. 1 is a block diagram illustrating the controller of an image forming apparatus that is common to the embodiments. The controller of the image forming apparatus depicted in FIG. 1 includes a CPU 101 that discriminates inputs, executes prescribed processing and renders decisions, and a memory 102 for recording various information such as settings and WWW servers to which access is forbidden. Further, the controller includes an input/output unit 103 for inputting/outputting settings information and print information, and a web browser unit 104 for utilizing the web browser function. The controller further includes a display unit 105 for displaying a web page, etc., acquired from the WWW server by the web browser unit 104, and a control panel 106 for input and output to and from the input/output unit 103 based upon information displayed on the display unit 105. The controller further includes a network communication unit 107 for performing communication with a mobile telephone or external server and exchanging information and data. The network communication unit 107 includes a wired communication unit 110 for exchanging information and data by wire such as a LAN cable, and a wireless communication unit 111 for exchanging information and data wirelessly such as by a Bluetooth function. The controller further includes an access decision unit 108 for discriminating whether a specified WWW server is accessible or not, and an image processor 109 for performing image processing and image formation (printing).

Figure 2:
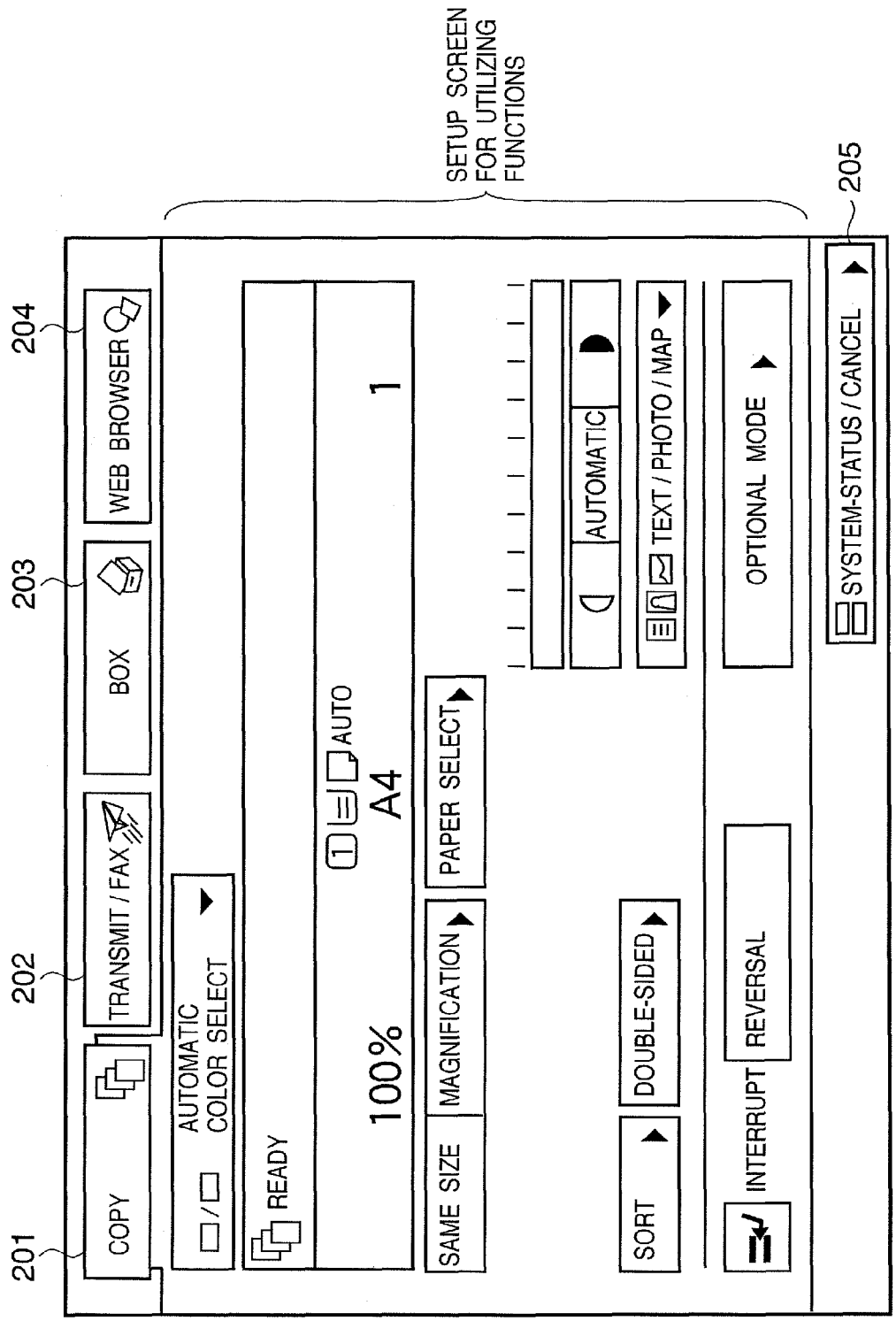
FIG. 2 is a diagram illustrating an example of a display on a display unit that functions as a control panel of the image forming apparatus common to the embodiments of the present invention.

The structure of the control panel 106 of the image forming apparatus will be described next. FIG. 2 is a diagram illustrating an example of a display on the display unit 105 that functions also as the control panel 106 of the image forming apparatus common to the embodiments of the present invention. The display unit 105 comprises a touch-sensitive panel and also functions as the control panel 106 at the same time. By touching (pressing) icons (buttons) that represent setting items displayed on the touch-sensitive panel, it is possible to input settings and information to the image forming apparatus.

Displayed on the display unit 105 are not only icons for making settings but also a copy icon 201 for transitioning to a setting screen for utilizing a copy function, and a transmit/fax icon 202 for transitioning to a setting screen for the purpose of utilizing a transmit or fax function. Further displayed on the display unit 105 is a box icon 203 for transitioning to a setting screen for the purpose of utilizing a box function (a function for storing data in a box). Further displayed on the display unit 105 is a web browser icon 204 for transitioning to a screen that is for utilizing a web browser function (referred to simply as a "web browser" below). Further displayed on the display unit 105 is a system-status/halt icon 205 for transitioning to a screen for displaying the system status of the image forming apparatus and the job that is currently running. It should be noted that a setting screen for utilizing the copy function is being displayed as an example in FIG. 2.

[Mobile Telephone]

Figure 15:
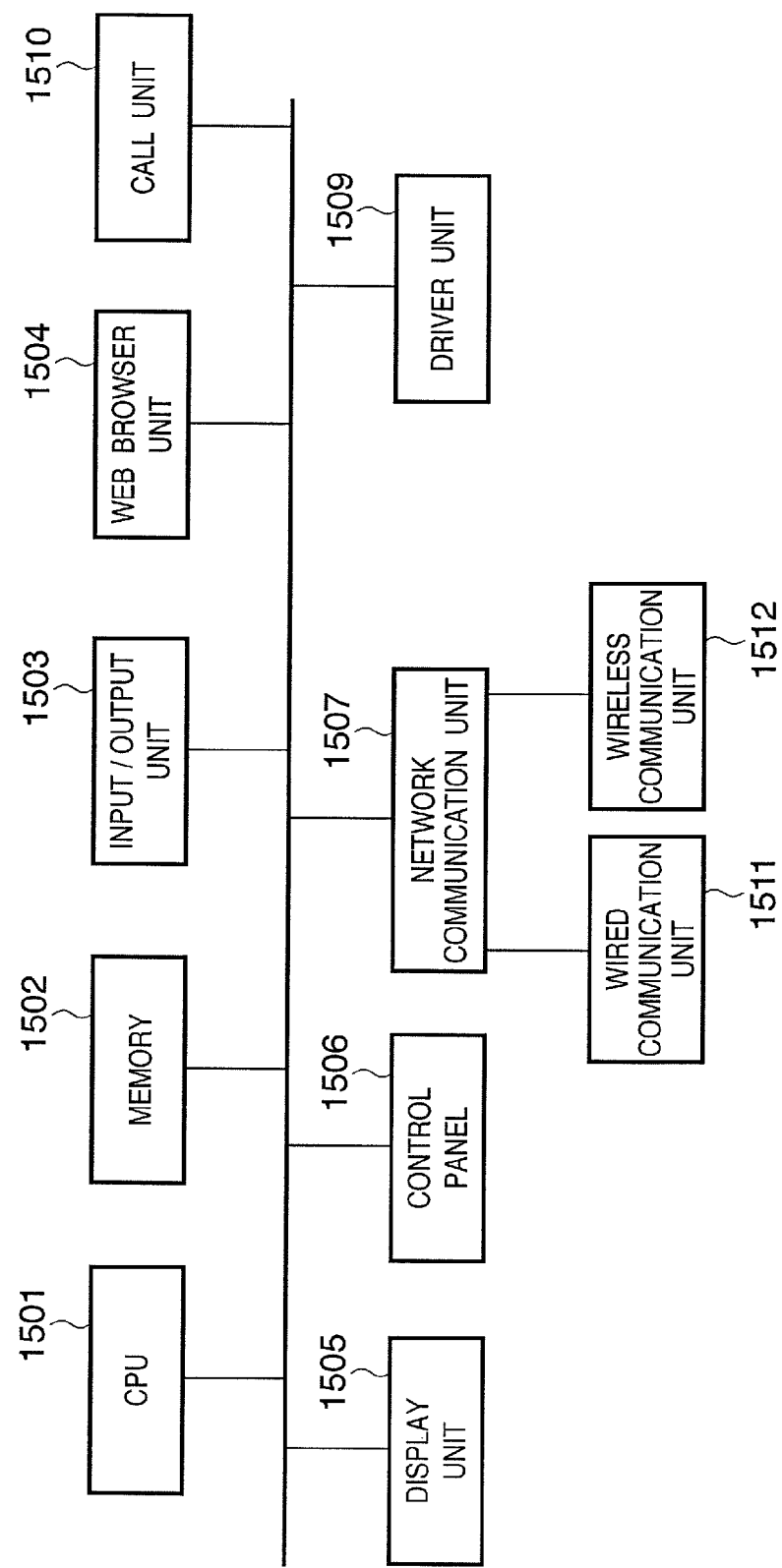
FIG. 15 is a block diagram illustrating a controller of the mobile telephone according to the first embodiment of the present invention.

A mobile telephone serving as an example of a mobile information terminal will be described next. The block structure of the controller of the mobile telephone will be described first with reference to FIG. 15. The controller of the mobile telephone shown in FIG. 15 includes a CPU 1501 that discriminates inputs, executes prescribed processing and renders decisions, and a memory 1502 for recording various information such as telephone numbers and incoming ring tones, etc. The controller further includes an input/output unit 1503 for inputting and outputting telephone numbers and the body of mail, and a web browser unit 1504 for utilizing a web browser function. The web browser unit 1504 displays the web page of a specified URL. That is, the web browser unit 1504 accesses a WWW server specified by an URL and acquires content displayed by the web browser. The controller has a display unit 1505 for displaying a web page, etc., acquired from the WWW server by the web browser unit 1504, and a control panel 1506 serving as a user interface that enables inputs to and outputs from the input/output unit 1503 based upon information displayed on the display unit 1505. The controller further includes a network communication unit 1507 for exchanging information and data with a personal computer or image forming apparatus. The network communication unit 1507 includes a wired communication unit 1511 for exchanging information and data via a LAN cable or the like, and a wireless communication unit 1512 for exchanging information and data by a Bluetooth function or the like. The controller further includes a driver 1509 for exchanging print data with each image forming apparatus, and a telephone call unit 1510 whereby voice data, which is sent and received by the input/output unit 1503, is allowed to be sent and received by the user.

Figure 3:
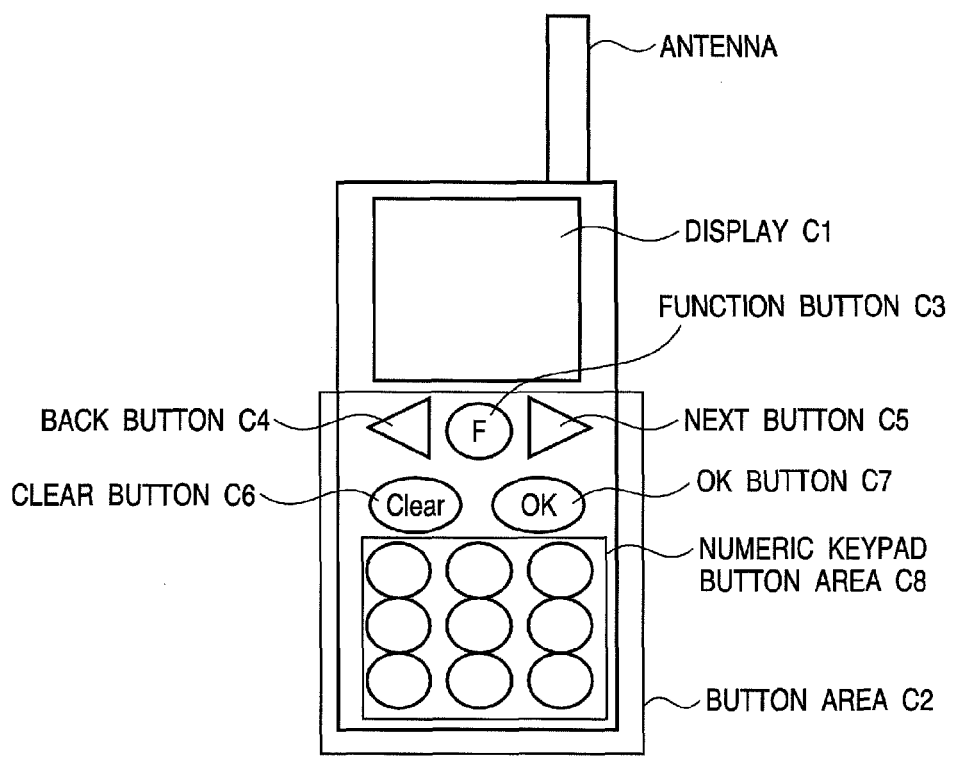
FIG. 3 is a diagram illustrating a specific example of a user interface (control panel) on a mobile telephone common to the embodiments of the present invention.

Next, the control panel 1506 serving as a user interface for exchanging information with the user will be described in brief. Components other than the control panel are identical with those of an ordinary mobile telephone and need not be described. FIG. 3 is a diagram illustrating a specific example of the user interface (control panel) on a mobile telephone common to the embodiments of the present invention.

As shown in FIG. 3, the control panel of the mobile telephone has a display C1 serving as a display unit for displaying print settings and status of printing, and a button area C2 serving as an input unit for inputting print settings and functions used. The button area C2 includes a FUNCTION button C3 for calling functions such as a web browser that has been stored in memory, a BACK button C4 for returning to the previous setting or previous page, and a NEXT button C5 for advancing to the next setting or next page. The button area C2 further includes a CLEAR button C6 for canceling an input or setting, an OK button C7 for finalizing an entry or setting, and a numeric keypad button area C8 comprising a group of keys for inputting alphanumerics and symbols ("*", "#", etc.).

Figure 4:
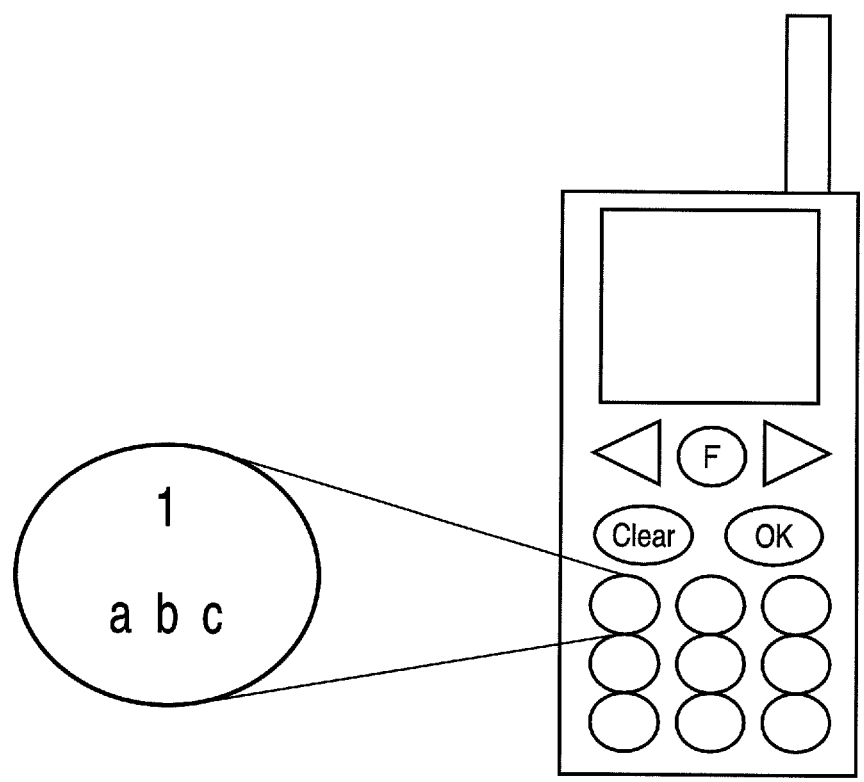
FIG. 4 is a diagram illustrating enlargement of one numeric key on the control panel of the mobile telephone shown in FIG. 3.

It is possible for any one button in the numeric keypad button area C8 to enter different characters by being pressed a number of times. One such button in the numeric keypad button area C8 is illustrated in FIG. 4, which is an enlarged view of one of the numeric keys on the control panel of the mobile telephone shown in FIG. 3. In the case of the button shown in FIG. 4, the characters that can be entered change over in the manner "1"→"a"→"b"→"c" whenever the button is pressed. This is an arrangement similar to that of the numeric keypad on an ordinary mobile telephone.

[Operation of Image Forming Apparatus]

Figure 5:
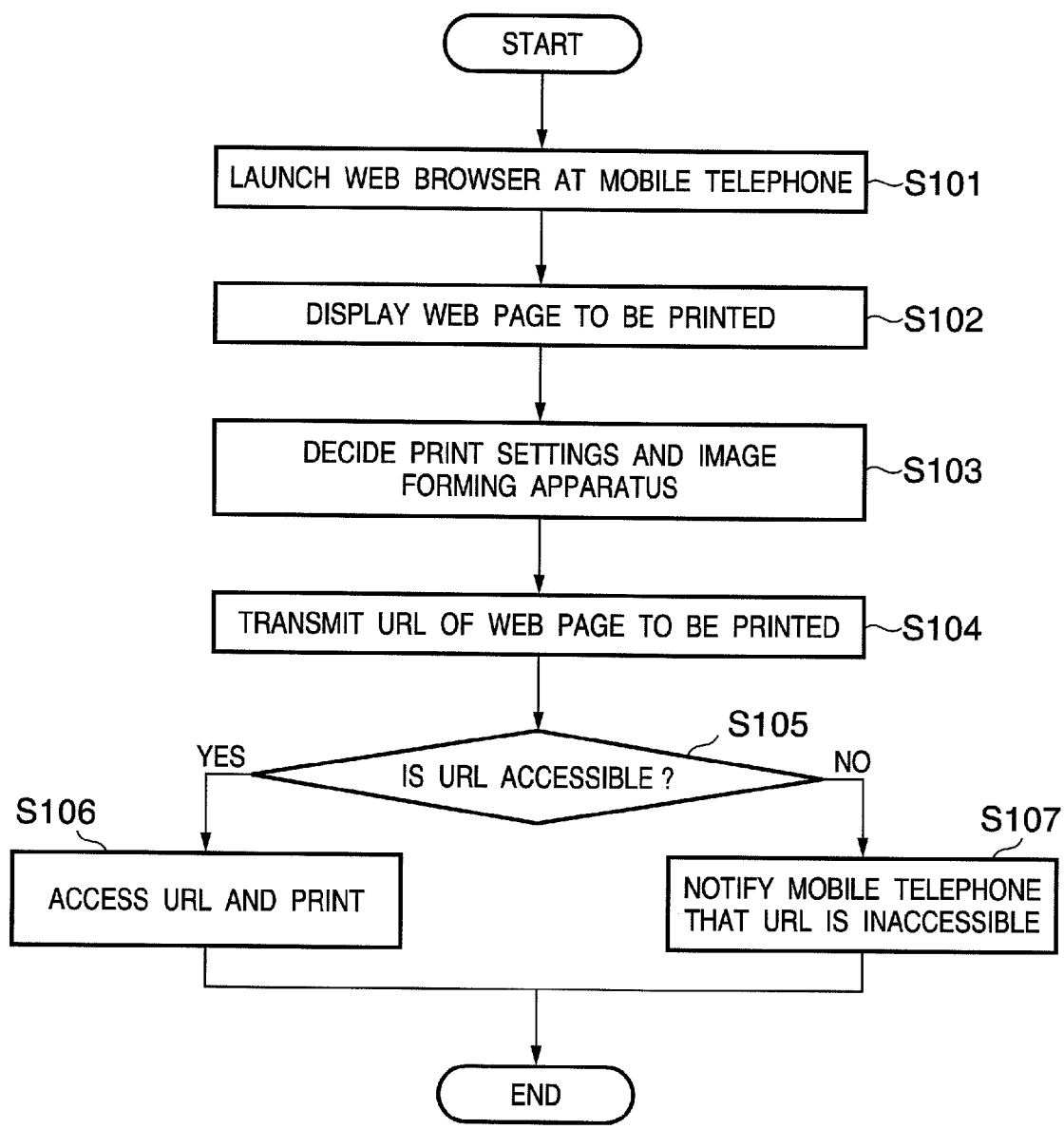
FIG. 5 is a flowchart useful in describing processing, which is for acquiring and printing a web page, in a mobile telephone and image forming apparatus according to a first embodiment of the present invention.

Described next will be a specific example of a case where a display is presented of information acquired by accessing a WWW server using an image forming apparatus based upon URL information that has been transmitted from a mobile telephone, and the web page is printed by the image forming apparatus. FIG. 5 is a flowchart useful in describing processing, which is for acquiring and printing a web page, in a mobile telephone and image forming apparatus according to the first embodiment of the present invention. The processing of steps S101 to S104 is executed by the mobile telephone, and the processing of steps S105 to S107 is executed by the image forming apparatus.

Figure 6:
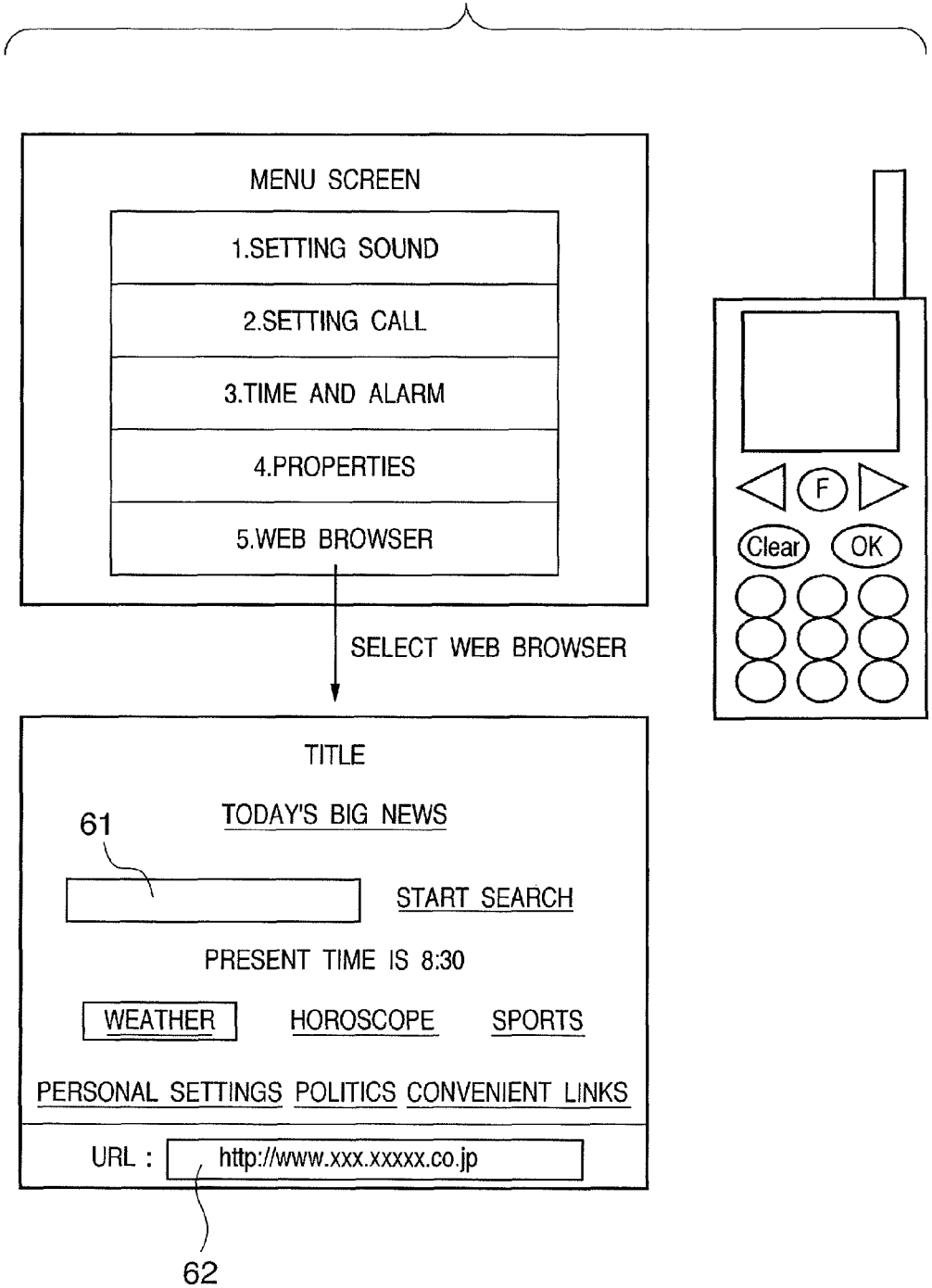
FIG. 6 is a diagram illustrating a screen on which a web page is displayed by a web browser on the display of the mobile telephone.

First, in order to use the web browser function on the mobile telephone, the user presses the FUNCTION button C3 to display a menu screen (see the top half of FIG. 6). Next, the user presses the "5" key in the numeric keypad button area C8 or places a cursor at "WEB BROWSER" on the screen using the NEXT button C5 or BACK button C4 and presses the OK button C7 (step S101). Selecting a specific item by thus using the numeric keypad or the cursor shall be referred to simply as "selecting" below. As a result of this operation, the web browser function is launched and a predetermined web page is displayed on the display screen of the mobile telephone.

FIG. 6 is a diagram illustrating the screen on which the web page is displayed by the web browser on the display of the mobile telephone. It should be noted that a web page displayed when the web browser function is initially launched shall be referred to as an "initial screen", and that the URL of this web page has been stored in memory. The underlined characters (e.g., "Today's Big News) on the web page represent a link to another web page. That is, if these underlined characters are selected, the web page at the URL that has been stored in memory in correspondence with these characters is displayed.

Next, in order to display a web page that is to be printed, the user selects underlined characters (text reading "SPORTS" in this case) to display the page (step S102). It should be noted that a web page to be printed can be displayed not only by selecting underlined characters but also by entering characters in a search word input field 61 and selecting "START SEARCH" or by directly entering an URL in an URL area 62 and pressing the OK button C7.

Figure 7:
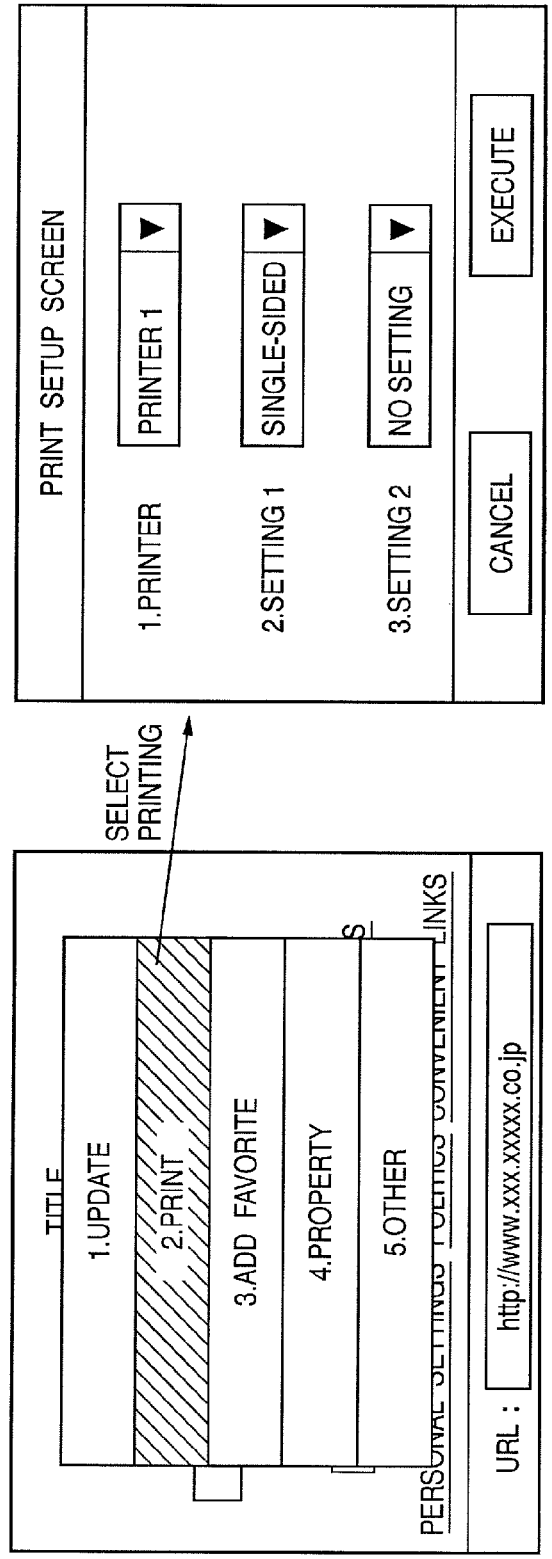
FIG. 7 is a diagram illustrating a screen, which is for performing printing, displayed on the display of the mobile telephone.

With the web page to be printed thus being displayed, the user presses the FUNCTION button C3, thereby displaying a function list in a pop-up menu, and selects "PRINT". FIG. 7 is a diagram illustrating a screen, which is for performing printing, displayed on the display screen of the mobile telephone. As shown on the right side of FIG. 7, a print setup screen for deciding the image forming apparatus to perform printing as well as the print setting is displayed.

Next, the user selects the image forming apparatus (a printer in this case) and print settings on the displayed screen shown on the right side of FIG. 7 (step S103). It is assumed that printer candidates and print settings have been stored beforehand in the memory of the mobile telephone.

Figure 8:
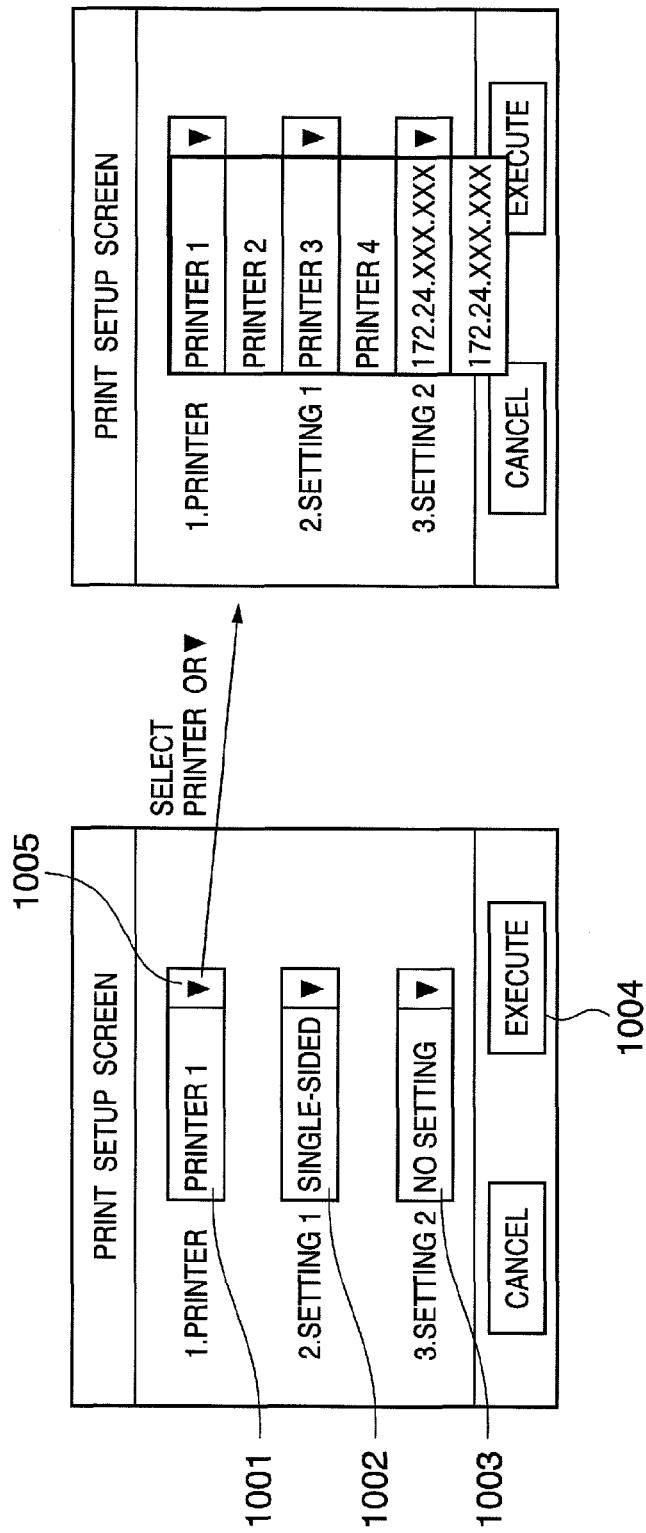
FIG. 8 is a diagram illustrating a screen, which is for setting up printing, displayed on the display of the mobile telephone.

A specific operation for making a selection involves selecting a printer selection area 1001 (FIG. 8) or, by pressing a printer list button 1005 (FIG. 8), displaying a list of printer names of candidates. FIG. 8 is a diagram illustrating a screen, which is for setting up printing, displayed on the display of the mobile telephone. Any printer is selected from this screen (here "PRINTER 1" is selected). Settings are selected in "SETTING 1" and "SETTING 2" by a similar operation. Here it is assumed that "DOUBLE-SIDED" is selected as "SETTING 1" and "DENSITY+2" is selected as "SETTING 2". These selections are displayed in a Setting 1 area 1002 and Setting 2 Area 1003, respectively.

If an execute button 1004 is subsequently pressed, the CPU of the mobile telephone that has sensed this determines whether it is possible to communicate with the image forming apparatus selected. A specific method of determining whether communication is possible is to investigate the state of communication with the image forming apparatus by running a ping program from the mobile telephone to the image forming apparatus.

Figure 9:
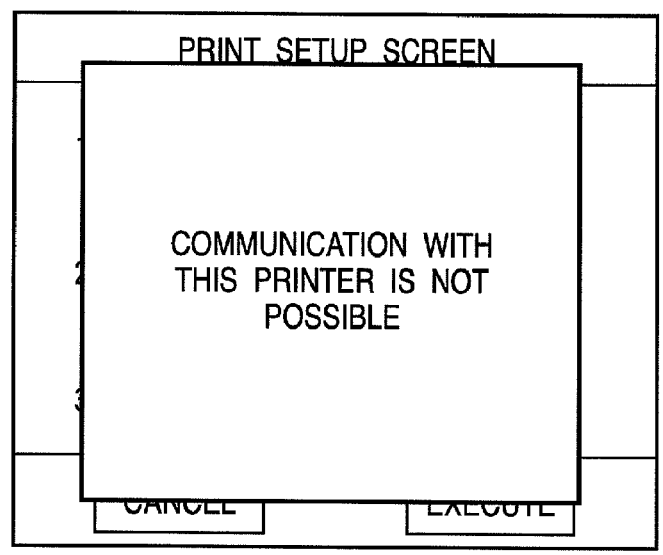
FIG. 9 is a diagram illustrating a screen on which a message is displayed on the display of the mobile telephone.

If the result of the investigation is that communication with the image forming apparatus is possible (i.e., if a response is received from the image forming apparatus), operation is as follows: The mobile telephone sends the selected image forming apparatus the URL of the web page to be printed, the selected print settings and information concerning the main body of the mobile telephone for the purpose of transmitting a message such as the result of printing from the image forming apparatus to the mobile telephone (step S104). The information concerning the main body of the mobile telephone includes the mail address and telephone number of the mobile telephone. If communication is not possible, on the other hand, then the URL and information concerning the main body of the mobile telephone, etc., are not transmitted and a message to the effect that communication with the designated image forming apparatus is not possible is displayed on the display C1. Here a message reading "COMMUNICATION WITH THIS PRINTER IS NOT POSSIBLE" is displayed. FIG. 9 is a diagram illustrating a screen on which a message is displayed on the display of the mobile telephone. It should be noted that although the determination as to whether communication is possible or not is performed after the execute button 1004 is pressed, this determination can be made before or after the selected printer is displayed in the printer selection area 1001. Further, if communication between the mobile telephone and image forming apparatus has become impossible, whether the mobile telephone and image forming apparatus are capable of communicated can be checked again by another wireless or wired communication method.

Upon receiving the URL, the print settings and the information concerning the main body of the mobile telephone from the mobile telephone, the image forming apparatus determines whether this URL can be accessed or not (step S105). More specifically, the image forming apparatus refers to a list of inaccessible URLs stored in memory 102 within the image forming apparatus and checks to see whether it is possible to access the URL that has been transmitted from the mobile telephone. The list of inaccessible URLs is one identical with a list employed in order to determine whether access is possible or not when use is made of the web browser function of the image forming apparatus. That is, it is assumed that criteria for determining whether access is possible or not employ criteria that have been registered beforehand in the image forming apparatus. Generally, if a web browser function is utilized in an image forming apparatus, often the WWW servers that can be accessed are restricted. In this embodiment, therefore, it is assumed that access conditions are also utilized in a print request from the mobile telephone.

If the result of the determination is that access is possible ("YES" at step S105), then the image forming apparatus accesses this URL and performs printing based upon the print settings received (step S106). If the result of the determination is that access is not possible ("NO" at step S105), then, based upon the information concerning the main body of the mobile telephone, the image forming apparatus notifies the mobile telephone that printing is impossible (step S107). In order to so notify the mobile telephone, the image forming apparatus extracts the telephone number of the mobile telephone from the information concerning the main body of the mobile telephone. The image forming apparatus then places a telephone call to the mobile telephone and runs a voice message that has been stored beforehand in the memory 102 of the image forming apparatus. Specifically, "PRINTING IS NOT POSSIBLE BECAUSE THIS URL CANNOT BE ACCESSED", for example, is run.

Another method of providing notification is to send predetermined text, which has been stored in the memory 102 of the image forming apparatus, to the mail address of the mobile telephone read out of the mobile telephone. More specifically, a message reading "PRINTING IS NOT POSSIBLE BECAUSE THIS URL CANNOT BE ACCESSED" is sent to the mobile telephone. Yet another method that is possible is to present characters on the display of the mobile telephone or to flash the backlighting of the display of the mobile telephone depending upon whether printing is possible or not.

Besides notifying the mobile telephone, an error display to the effect that the requested URL cannot be accessed may be presented on a prescribed location of the display unit 105 on the image forming apparatus.

Further, if, in an arrangement in which a record of results of print processing is capable of being stored in the memory 102 by the image forming apparatus, an URL requested by the mobile telephone is one that the image forming apparatus is incapable of accessing, then this fact may be recorded in the record of results of processing relating to printing. Examples of content stored in such a record are an indication that printing was not enabled because an URL was not accessible, and URLs that have been requested by the mobile telephone. In the event that a user with malicious intent attempts to print from an unauthorized URL, a record of this attempt can be preserved in the image forming apparatus. This leads to an improvement in the security of the image forming apparatus.

Thus, in this embodiment, it is made possible to receive and print data only from an accessible WWW server, unauthorized utilization can be prevented and security can be enhanced. In particular, in a case where an unspecified number of users employ the apparatus, the above-mentioned function is extremely effective.

Second Embodiment

In the first embodiment described above, information such as the URL of a web page to be printed is transmitted from a mobile telephone to an image forming apparatus. In this embodiment, however, a case where data per se to be printed is transmitted from a mobile telephone to an image forming apparatus will be described. That is, a case will be described in which a display can be presented on the mobile telephone but not on a web browser of the image forming apparatus owing to a restriction on the web server.

Figure 11:
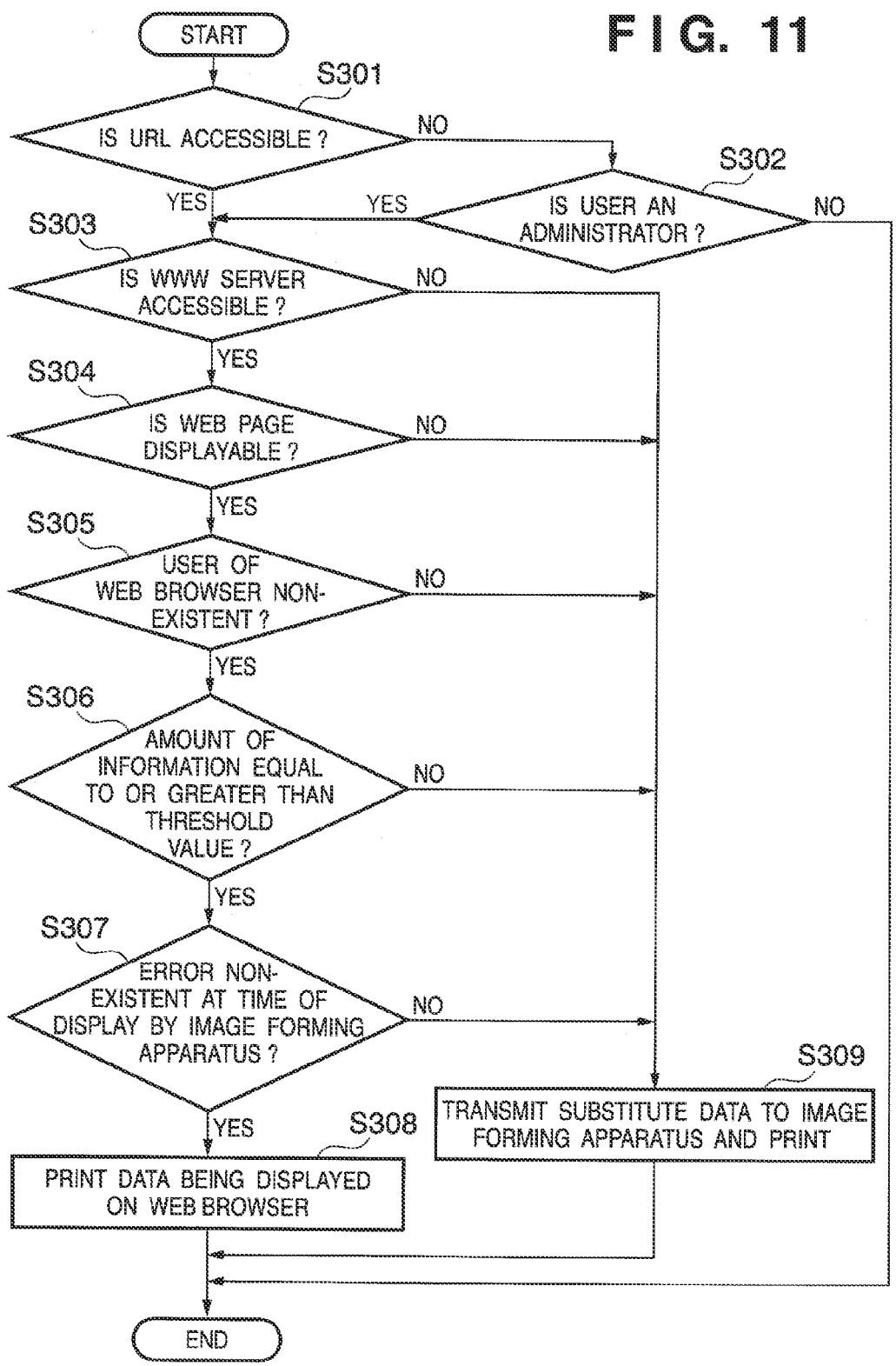
FIG. 11 is a flowchart useful in describing print processing in an image forming apparatus according to a second embodiment of the present invention.

It should be noted that since the basic operation and control content are identical with those of the first embodiment set forth above, only aspects that are different will be described with reference to the flowchart of FIG. 11. That is, FIG. 11 is a flowchart useful in describing print processing in an image forming apparatus according to a second embodiment of the present invention. Further, processing up to the decision regarding the image forming apparatus to perform printing and the print settings (i.e., processing up to step S103 in FIG. 5) is identical with that of the first embodiment and need not be described again.

If connection between the mobile telephone and image forming apparatus is confirmed, then the mobile telephone sends the image forming apparatus a command for sending the mobile telephone an access-prohibited list (or an access-allowed list) that has been stored beforehand in the memory 102 of the image forming apparatus. The image forming apparatus then determines whether the URL of the web page to be printed is accessible or not (step S301). It is assumed that this determination is based upon the list of inaccessible URLs stored in the memory 102 of the image forming apparatus just as in the first embodiment.

Figure 10:
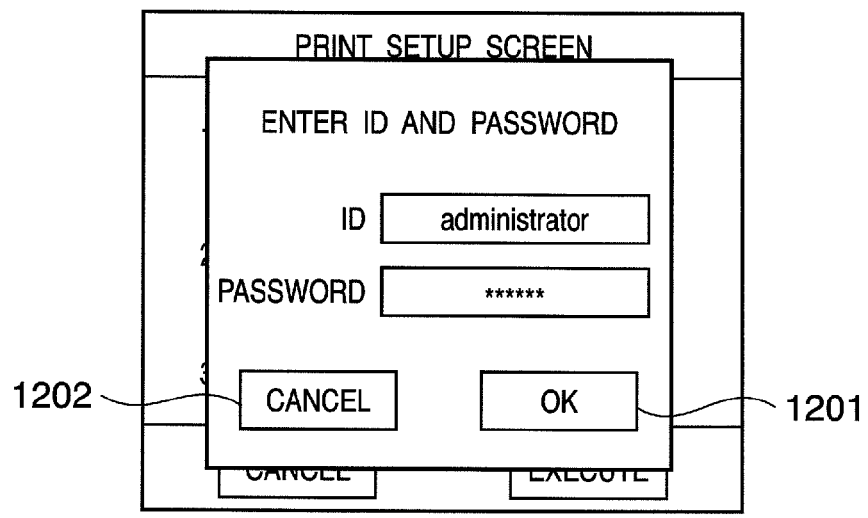
FIG. 10 is a diagram illustrating a password request screen displayed on the display of the mobile telephone.

If the URL is not accessible ("NO" at step S301), then the image forming apparatus performs user authentication and determines whether the user is one having the right to be an administrator of the image forming apparatus (step S302). More specifically, the image forming apparatus displays a message reading "ENTER ID AND PASSWORD" on the display C1 of the mobile telephone and waits for an input from the user. FIG. 10 is a diagram illustrating a password request screen displayed on the display of the mobile telephone.

If the user enters an ID and password on this screen and presses an OK button 1201, then the mobile telephone transmits the entered ID and password to the image forming apparatus. Whether the user is one having the right of an administrator is determined by the CPU 101 of the image forming apparatus.

If the result of the determination is that the user is not one having the right of an administrator ("NO" at step S302), or if a cancel button 1202 is pressed, then a message to the effect that this URL could not be accessed is displayed on the display C1 and processing is exited. On the other hand, if the user is one having the right of an administrator ("YES" at step S302), then processing (of step S303, described later) identical with that of the case where the URL is accessible is executed.

If it is determined at step S301 that the URL is accessible or that the user has the right of an administrator ("YES" at step S302), then the image forming apparatus determines whether the WWW server is accessible (step S303). More specifically, the CPU 1501 of the mobile telephone executes a command that is for checking the network status of the image forming apparatus that has been stored in the memory 1502 of the mobile telephone. That is, the CPU 1501 runs a ping program with respect to a plurality of WWW servers that have been stored in advance and, if even one WWW server does not respond, runs a program that sends back the fact that a connection to the network has not been made. If the result of the determination is that the WWW server is not accessible ("NO" at step S303), then the mobile telephone transmits the acquired data per se (substitute data) to the image forming apparatus. Upon receiving this data, the image forming apparatus prints the received substitute data (step S309) without accessing the WWW server. It should be noted that when the substitute data is transmitted from the mobile telephone to the image forming apparatus, use may be made of the connection established at step S104 or the mobile telephone and image forming apparatus may be connected directly by wire using a USB cable. On the other hand, if the WWW server is accessible ("YES" at step S303), then the image forming apparatus determines whether the web page is capable of being displayed (step S304).

More specifically, first the web page acquired by the web browser is analyzed (HTML language is analyzed) by the CPU 1501 of the mobile telephone and an application necessary for displaying the web page is detected. For example, if HTML contains the tag <APPLET>, then Java (registered trademark) VM or a Java plug-in is necessary. If HTML contains a reference to an extension .swf, then a flash (registered trademark) player is necessary. Next, the CPU 1501 of the mobile telephone sends a confirmation request to confirm whether the detected application is in the memory 102 of the image forming apparatus. It is determined from the result of the confirmation request whether the image forming apparatus has been provided with the necessary application. If the necessary application has been provided, then it is judged whether the web page is capable of being displayed. If the result of the determination is that the web page is not capable of being displayed ("NO" at step S304), then the mobile telephone transmits substitute data to the image forming apparatus and the data is printed by the image forming apparatus (step S309). On the other hands if the web page is capable of being displayed ("YES" at step S304), then it is determined whether a user employing the web browser function of the image forming apparatus exists (step S305). A specific method of accomplishing this is for the mobile telephone to send the image forming apparatus a command that instructs the image forming apparatus to investigate whether there is a user who is using the web browser. Upon receiving this command, the CPU 101 of the image forming apparatus checks to determine whether there is a user who is using the web browser and sends the result back to the mobile telephone.

If the result of the determination is that a user who is using the web browser exists ("NO" at step S305), the mobile telephone transmits substitute data for printing to the image forming apparatus. This makes it possible to prevent problems caused by the URL sent by the mobile telephone being accessed by the web browser of the image forming apparatus. Upon receiving the substitute data, the image forming apparatus prints the received substitute data without accessing the WWW server (step S309). On the other hand, if a user who is using the web browser does not exist ("YES" at step S305), then the amount of information in the web page acquired by the web browser of the mobile telephone is investigated and it is determined whether the amount is equal to or greater than a predetermined threshold value (step S306). If the rate of communication between the image forming apparatus and the mobile telephone is higher than the rate of communication between the image forming apparatus and the WWW server, then an amount of information such that the time at which the image forming apparatus receives data from the mobile telephone and the time at which the image forming apparatus acquires data from the WWW server become equal is adopted as the threshold value. As a result, if the amount of information is less than the threshold value ("NO" at step S306), then transmitting substitute data from the mobile telephone to the image forming apparatus will result in a shorter communication time for the print data and, hence, the substitute data is transmitted to the image forming apparatus. The substitute data is printed by the image forming apparatus (step S309). On the other hand, if the amount of information is equal to or greater than the threshold value ("YES" at step S306), then, as in the first embodiment, the URL of the web page to be printed is transmitted to the mobile telephone and it is determined whether the web page can be displayed by the image forming apparatus without the occurrence of an error (step S307).

More specifically, an error-check command that has been stored in memory 1502 and the URL to be printed are transmitted from the mobile telephone to the image forming apparatus. If the error-check command is received, the URL received by the CPU 1501 is displayed by the web browser. Furthermore, the displayed content (e.g., HTML of the display screen) is analyzed and it is determined whether the web page can be displayed on the web browser without a time-out or content-undetected error (http 404 file-undetected error). It should be noted that when a web page is displayed, it is regarded that content cannot be acquired if a password is requested from the WWW server. If a password is requested, this is regarded as an error, although it is also possible to input a password from the control panel of the mobile telephone or from the control panel of the image forming apparatus and reconfirm whether the web page can be displayed or not. If the result is that the web page can be displayed without the occurrence of an error, then the data being displayed is printed (step S308). If an error occurs, on the other hand, substitute data is transmitted from the mobile telephone to the image forming apparatus and this data is printed by the image forming apparatus (step S309). Thus, with the image forming apparatus according to this embodiment, a changeover is made between a method of acquiring and printing data from a WWW server and a method of acquiring and printing data from a mobile telephone, based upon the URL to be printed, the network status of the image forming apparatus and the communication speed.

[Derivative]

Although it is determined at step S305 whether a user of the web browser of the image forming apparatus exists, it is also possible to make a determination in accordance with the status of use of the image processor 109 or CPU 101 of the image forming apparatus. And although a determination is made based upon the amount of information on a web page is made at step S306, this does not impose a limitation upon the invention. For example, it is also possible to decide the method of acquiring data to be printed by referring to cache information of a web browser function that has been stored in the memory 102 of the image forming apparatus and deciding the acquisition method based upon whether the URL of the web page to be printed is in memory. Further, in the processing described above, there is an automatic changeover, without the need for operation by the user, between acquisition by the image forming apparatus of print data from a WWW server and receipt by the image forming apparatus of print data from a mobile telephone. However, it is also possible for the user to make the designation manually by utilizing a GUI (Graphical User Interface) on the control panel of the image forming apparatus or on the control panel of the mobile telephone.

Thus, in accordance with the second embodiment, if the user is a specific user such as an administrator, it is possible to print from an URL to which access has been forbidden. Further, by changing over between receipt of print data from a WWW server and receipt of substitute print data from a mobile telephone, it is possible to perform versatile, highly efficient printing.

Third Embodiment

The first embodiment is such that in a case where access is not possible, the image forming apparatus does not perform printing that is based upon access to a WWW server. In this embodiment, however, printing is performed, even in a case where access is not possible, by preserving a record such as information concerning the source of a data transmission or a log of printing. It should be noted that the image forming apparatus that has received an URL does not immediately start the printing of the web page specified by the URL. That is, a secure working mode will be described in which printing is executed after the user comes to the location where the image forming apparatus has been installed, thereby making it difficult for a printout to be seen by another user or to come into the possession of another user.

Figure 12:
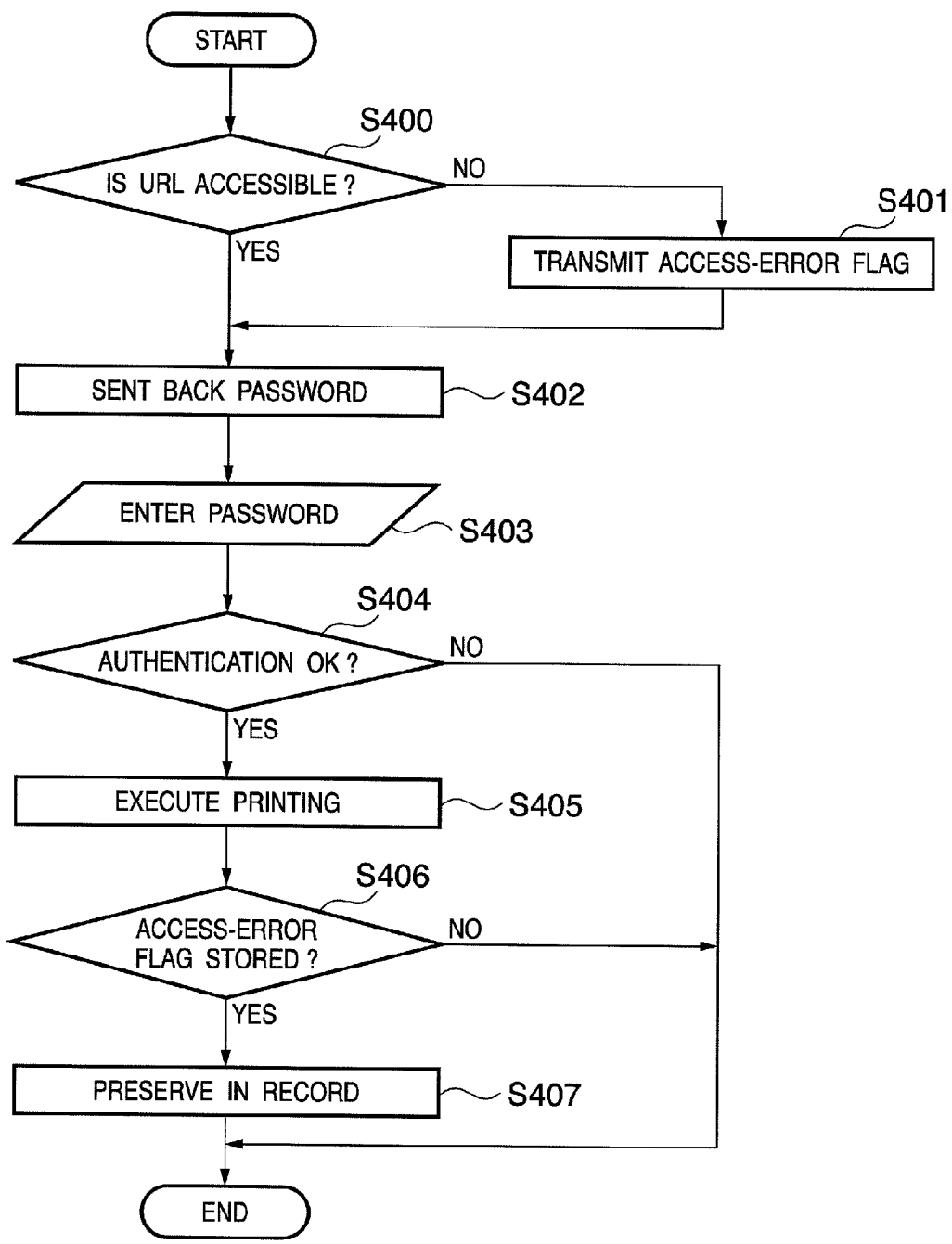
FIG. 12 is a flowchart useful in describing print processing in an image forming apparatus according to a third embodiment of the present invention.

It should be noted that since the basic operation and control content are identical with those of the first and second embodiments set forth above, only aspects that are different will be described with reference to the flowchart of FIG. 12. That is, FIG. 12 is a flowchart useful in describing print processing in an image forming apparatus according to a third embodiment of the present invention. Further, processing up to a decision (step S400 in FIG. 12) regarding whether or not an URL is accessible (i.e., processing up to step S302 in FIG. 11) is identical with that of the first embodiment and need not be described again.

First, besides the information that the mobile telephone transmits to the image forming apparatus in the case of an accessible URL, the mobile telephone additionally transmits information indicative of an inaccessible URL to the image forming apparatus in the case of an inaccessible URL (step S401). The information transmitted from the mobile telephone to the image forming apparatus in the case of an accessible URL includes the URL, the print settings and the information concerning the main body of the mobile telephone. Further, the information indicating that an URL is inaccessible shall be referred to as an "access-error flag" below.

Upon receiving data (inclusive of the access-error flag) from the mobile telephone, the image forming apparatus uses the CPU 101 to generate a one-time password that corresponds solely to the transmitted data (i.e., a password uniquely corresponding to the data transmission from the mobile telephone). The image forming apparatus stores this password in memory 102 in correspondence with the received data and transmits the password to the mobile telephone (step S402).

Figure 13:
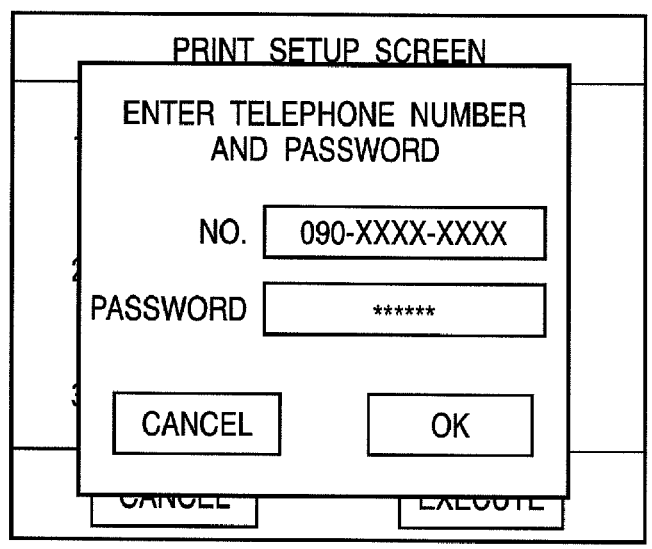
FIG. 13 is a diagram illustrating a screen on which a password has been entered from the control panel of the image forming apparatus.

If receipt of the password is verified by the CPU of the mobile telephone, then the password is displayed on the display C1 of the mobile telephone. If the user enters this password from the control panel 106 (see FIG. 13) of the image forming apparatus (step S403), then the CPU 101 of the image forming apparatus determines whether it matches the information that has been stored in memory 102 (step S404). FIG. 13 is a diagram illustrating a screen on which a password has been entered from the control panel 106 of the image forming apparatus.

If the result of the determination is that the passwords match, then the web browser of the image forming apparatus is launched automatically. In addition, the URL that has been stored in memory 102 in correspondence with the password is accessed. The print settings that have likewise been stored in correspondence in memory 102 are reflected in the image forming apparatus, and a confirmation message inquiring as to whether it is permissible to print this URL based upon these settings is displayed on the display unit. If confirmation is made by the user, printing is actually carried out (step S405).

Together with execution of printing, whether or not the access-error flag has been stored in memory 102 together with and in correspondence with the password is determined by the CPU 101 (step S406). If the result of the determination is that the access-error flag has been stored ("YES" at step S406), the information concerning the main body of the mobile telephone and the URL are stored in memory 102 and processing is exited (step S407). On the other hand, if the access-error flag has not been stored ("NO" at step S407), then no further processing is executed and processing is exited.

It should be noted that if the passwords do not match, a message indicating that the passwords are different is sent to the control panel of the image forming apparatus and processing is exited.

Thus, in accordance with the third embodiment, printing designated from a mobile telephone is not executed immediately. Rather, execution of printing is started after a password is accepted at the control panel 106 of the image forming apparatus. This makes it possible assure the security of a printout. Further, while making it possible to perform printing from an URL to which access has been forbidden, the fact that printing has been performed from this URL is stored in a record, thereby enhancing convenience as far as the user who designates printing is concerned. On the other hand, in the event that an impropriety based upon printing from an URL whose access has been forbidden is discovered, it is possible for the administrator who manages the image forming apparatus to track down the cause of the impropriety.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-302163, filed on Oct. 17, 2005 and No. 2006-232815, filed on Aug. 29, 2006, which are hereby incorporated by reference herein in their entirety.

What is claimed is:

1. An image forming apparatus comprising:
a web browser unit adapted to display a web page;
a receiving unit adapted to receive a URL of the web page from a mobile information terminal;
a first determination unit adapted to determine whether the URL is accessible based at least upon a comparison of the URL with URLs stored in memory of the image forming apparatus;
a second determination unit adapted to determine whether a user of the image forming apparatus is an administrative user when it is determined by the first determination unit that the URL is not accessible;
a third determination unit adapted to determine whether or not the web browser unit is operated by the user of the image forming apparatus;
a fourth determination unit adapted to determine whether a data amount of the web page is (a) equal to or greater than a threshold or (b) less than the threshold, when it is determined by the third determination unit that the web browser unit is not operated by the user of the image forming apparatus;
a fifth determination unit adapted to determine whether or not an error is detected when the web browser unit displays the web page, when it is determined by the fourth determination unit that the data amount is equal to or greater than the threshold;
an acquisition unit adapted to (a) access a server associated with the URL and acquire data from the server when it is determined that the error is not detected when the web browser unit displays the web page, the data representing the web page as displayable by the web browser unit of the image forming apparatus, and (b) acquire substitute data from the mobile information terminal in the case where it is determined that the web browser unit is operated by the user, or that the data amount is less than the threshold, or that the error is detected when the web browser unit displays the web page, the substitute data representing the web page as acquired from the server and analyzed by a web browser and processing device of the mobile information terminal;
a printing unit adapted to perform printing using the data or the substitute data acquired by said acquisition unit; and
a notification unit adapted to display an error notification when it is determined by the second determination unit that the user of the image forming apparatus is not the administrative user,
wherein said web browser unit, receiving unit, the first determination unit, the second determination unit, the third determination unit, the fourth determination unit, the fifth determination unit, the acquisition unit, the printing unit, and the notification unit are implemented at least in part by hardware components of the image forming apparatus.

2. An image forming apparatus according to claim 1, wherein the acquisition unit is adapted to acquire the substitute data from the mobile information terminal in the case where it is determined that the web browser unit is operated by the user.

3. An image forming apparatus according to claim 1, wherein the acquisition unit is adapted to acquire the substitute data from the mobile information terminal in the case where it is determined that the data amount is less than the threshold.

4. An image forming apparatus according to claim 1, wherein the acquisition unit is adapted to acquire the substitute data from the mobile information terminal in the case where it is determined that the error is detected when the web browser unit displays the web page.

5. A method implemented by an image forming apparatus, the method comprising:
a receiving step of receiving a URL of a web page from a mobile information terminal;
a first determination step of determining whether the URL is accessible based at least upon a comparison of the URL with URLs stored in memory of the image forming apparatus;
a second determination step of determining whether a user of the image forming apparatus is an administrative user when it is determined in the first determination step that the URL is not accessible;
a third determination step of determining whether or not a web browser unit adapted to display the web page is operated by the user of the image forming apparatus, the image forming apparatus comprising the web browser unit;
a fourth determination step of determining whether a data amount of the web page is (a) equal to or greater than a threshold or (b) less than the threshold, when it is determined in the third determination step that the web browser unit is not operated by the user of the image forming apparatus;
a fifth determination step of determining whether or not an error is detected when the web browser unit displays the web page, when it is determined in the fourth determination step that the data amount is equal to or greater than the threshold;
an acquisition step of (a) accessing a server associated with the URL and acquiring data from the server when it is determined that the error is not detected when the web browser unit displays the web page, the data representing the web page as displayable by the web browser unit of the image forming apparatus, and (b) acquiring substitute data from the mobile information terminal in the case where it is determined that the web browser unit is operated by the user, or that the data amount is less than the threshold, or that the error is detected when the web browser unit displays the web page, the substitute data representing the web page as acquired from the server and analyzed by a web browser and processing device of the mobile information terminal;
a printing step of performing printing using the data or the substitute data acquired in said acquisition step; and
a notification step of displaying an error notification when it is determined in the second determination step that the user of the image forming apparatus is not the administrative user.

6. A method according to claim 5, wherein the acquisition step includes acquiring the substitute data from the mobile information terminal in the case where it is determined that the web browser unit is operated by the user.

7. A method according to claim 5, wherein the acquisition step includes acquiring the substitute data from the mobile information terminal in the case where it is determined that the data amount is less than the threshold.

8. A method according to claim 5, wherein the acquisition step includes acquiring the substitute data from the mobile information terminal in the case where it is determined that the error is detected when the web browser unit displays the web page.

9. A non-transitory computer-readable storage medium storing a program that, when executed by one or more computers in an image forming apparatus, causes the image forming apparatus to execute a method comprising:
a receiving step of receiving a URL of a web page from a mobile information terminal;
a first determination step of determining whether the URL is accessible based at least upon a comparison of the URL with URLs stored in memory of the image forming apparatus;
a second determination step of determining whether a user of the image forming apparatus is an administrative user when it is determined in the first determination step that the URL is not accessible;
a third determination step of determining whether or not a web browser unit adapted to display the web page is operated by the user of the image forming apparatus, the image forming apparatus comprising the web browser unit;
a fourth determination step of determining whether a data amount of the web page is (a) equal to or greater than a threshold or (b) less than the threshold, when it is determined in the third determination step that the web browser unit is not operated by the user of the image forming apparatus;
a fifth determination step of determining whether or not an error is detected when the web browser unit displays the web page, when it is determined in the fourth determination step that the data amount is equal to or greater than the threshold;
an acquisition step of (a) accessing a server associated with the URL and acquiring data from the server when it is determined that the error is not detected when the web browser unit displays the web page, the data representing the web page as displayable by the web browser unit of the image forming apparatus, and (b) acquiring substitute data from the mobile information terminal in the case where it is determined that the web browser unit is operated by the user, or that the data amount is less than the threshold, or that the error is detected when the web browser unit displays the web page, the substitute data representing the web page as acquired from the server and analyzed by a web browser and processing device of the mobile information terminal;

a printing step of performing printing using the data or the substitute data acquired in said acquisition step; and a notification step of displaying an error notification when it is determined in the second determination step that the user of the image forming apparatus is not the administrative user.

10. A non-transitory computer-readable storage medium according to claim 9, wherein the acquisition step includes acquiring the substitute data from the mobile information terminal in the case where it is determined that the web browser unit is operated by the user.

11. A non-transitory computer-readable storage medium according to claim 9, wherein the acquisition step includes acquiring the substitute data from the mobile information terminal in the case where it is determined that the data amount is less than the threshold.

12. A non-transitory computer-readable storage medium according to claim 9, wherein the acquisition step includes acquiring the substitute data from the mobile information terminal in the case where it is determined that the error is detected when the web browser unit displays the web page.

* * * * *